United States Patent

[11] 3,554,478

| [72] | Inventor | Henry L. Sunderman |
| | | 945 S. Holt Ave., Sioux Falls, S. Dak. 75103 |
| [21] | Appl. No. | 770,951 |
| [22] | Filed | Oct. 28, 1968 |
| [45] | Patented | Jan. 12, 1971 |

[54] FOLDING BOOM FOR SPRAYER
5 Claims, 3 Drawing Figs.

[52] U.S. Cl. ............................................. 248/278, 239/167
[51] Int. Cl. ............................................. B05b 3/00
[50] Field of Search ............................................. 248/278; 211/119.06; 239/159, 164, 166, 167, 168; 172/(Inquired)

[56] References Cited
UNITED STATES PATENTS

| 2,690,355 | 9/1954 | Waters et al. | 239/168 |
| 2,910,245 | 10/1959 | Burroughs | 239/167 |
| 3,301,487 | 1/1967 | Young | 239/168 |
| 3,329,030 | 7/1967 | Dijkhof | 239/167 |

FOREIGN PATENTS

| 1,068,422 | 2/1954 | France | 239/167 |

*Primary Examiner*—Marion Parsons, Jr.
*Attorney*—Lucas J. De Koster

ABSTRACT: A folding sprayer arm having a unique mechanism to fold the arm and position it behind the sprayer by a single manual control. An arrangement of pivots and arms contribute to the motion and a flexible support wound onto a quadrant helps to control the motion.

PATENTED JAN 12 1971

3,554,478

Henry L. Sunderman
INVENTOR.

BY [signature]

His Att'y.

FOLDING BOOM FOR SPRAYER

This invention relates to extended arms used to support spray nozzles or the like on agricultural implements.

As agricultural units grow in size, the implements of agriculture are made for increased capacity. Whereas, in the past, it might be adequate to spray an agricultural spray over a swath 8 feet in width, current practice may suggest a swatch three or four times that wide. At the same time, the requirement of portability necessitates that the arms carrying the spray nozzles must be somehow collapsed into a smaller span.

Several possibilities of such collapse may be considered. The boom or arm may be telescoped together. This results in a looping of the hoses necessary to reach the nozzles, and still requires a considerable width and is relatively expensive.

The arms may be swung to the rear or raised up as a unit. This structure leaves very long, substantially unsupported booms extending from the implement.

My invention provides that the boom collapse in the center and be folded. At the same time, it is pulled upward and turns to the rear so that while there is a substantial upward extension, it is only about half of the total boom length, and there is no substantial addition to the basic width of the sprayer. Another feature of the device of my invention is that as the boom is folding, the end of the boom drops to a point only slightly lower than it was in an extended position. Thus, the boom never drops on the ground nor interferes with growing crops or the like.

A more complete understanding of my invention may be had from a study of the following specification and the drawings in which.

Figure 1:
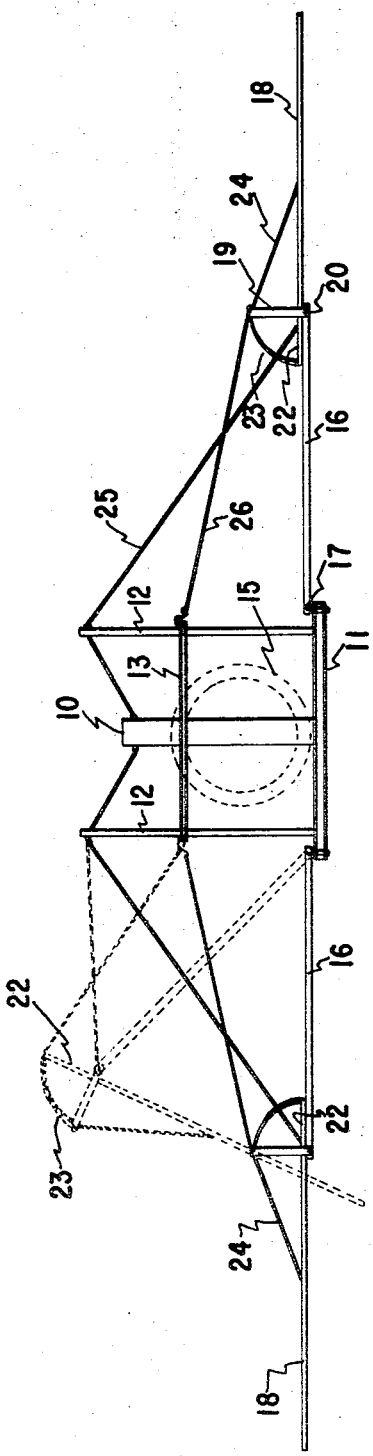
FIG. 1 is an end elevational view of my device with the booms extended and showing one of the booms in an alternate partially retracted position.
Figure 2:
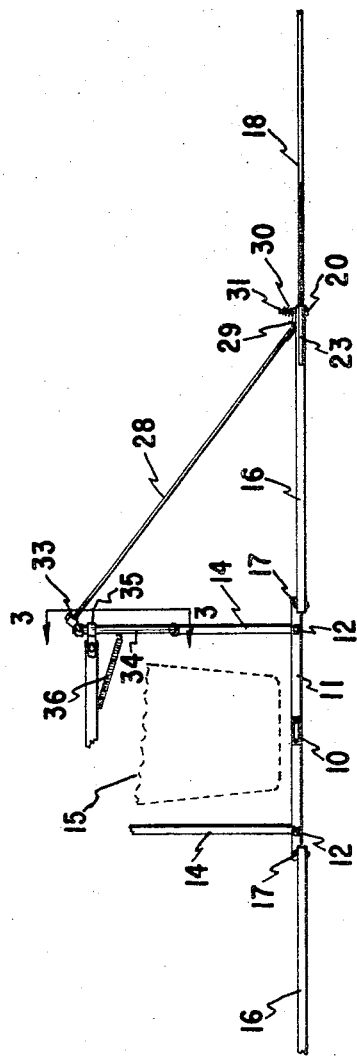
FIG. 2 is a partial top plan view of my device with some of the ropes removed.

Briefly my invention comprises a folding sprayer arm comprising a boom articulated near the center, and having a quadrant mounted on one part of the boom to provide for easy raising of the arm.

More specifically and referring to the FIGS., my device consists of a framework having a center post 10 mounted on a base member 11. A pair of end posts 12 supported by a cross member 13 may also be used. The base member 11 is supported by longitudinal members 14 which may be fastened to a trailer or adapted to be mounted on a farm tractor having a lifting hitch. A tank 15 for holding material to be sprayed may also be mounted in the basic framework.

An inner leg 16 of the boom is mounted on the base member 11 so that it can pivot about both a vertical axis and a horizontal axis. This is accomplished by using an inverted L-shaped pivot member 17 journaled in the base member 11 on a vertical axis, and in the inner leg 16 on a horizontal axis. The horizontal axis is essentially longitudinal of the device when the boom is extended. Thus, the inner leg can be raised by pivoting around the horizontal axis while at the same time turning to front or rear about the vertical axis.

The outer leg 18 of the boom is pivoted to the inner leg 16 at the end of the inner leg. This is accomplished by providing an upright member 19 which includes a pair of ears embracing the end of the inner leg. A pivot member 20 extends through the ears and the inner leg to provide for pivotal movement.

The outer leg 18 includes an inward extending portion 22 which overlaps the inner leg 16 and provides a stop means to prevent collapse of the boom in one direction. The portion 22 also provides one radius for a quadrant member 23 extending between that portion and the upright 19. A bracing member 24 which may be either rigid or flexible extends from the top of the upright 17 to a point somewhat outboard on the outer leg 18.

To raise the boom and cause it to fold, I provide a pull rope 25 which extends through pulley means on the end posts 12 and the center post 10 and thence toward the operator of the device. This rope is fastened to the inner leg 16 near the pivot member 20. It will be obvious that a pull on rope will raise the outer end of the inner leg. As that leg is raised, the outer leg 18 will tend to drop. This is particularly true because it is supported by a flexible brace 26 fastened at one end to the upright 19 and at the other end to the end post 12. The raising of the end of the leg 16 relaxes the tension in the brace 26 and the outer leg drops. The amount of drop, however, is controlled by the fact that the brace is supported on the quadrant 23 to provide a controlled folding of the boom as is shown by the alternate position on the left side in FIG. 1.

Motion of the boom longitudinally of the trailer or carrying device is controlled by a rigid angular brace 28. This brace has a flattened end 29 which is bent outwardly and pivotally mounted on the pivot member 20. The member 20 extends through the end 29 and is surrounded by a compression spring 30. The spring 30 is compressed between the end 29, and a head 31 or cap on the pivot member 20.

Figure 3:
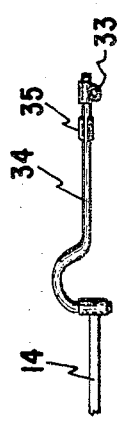
FIG. 3 is a view to an enlarged scale from line 3-3 of FIG. 2.

At its other end, the brace 29 is pivoted on an L-shaped pivot member 33. This member provides for motion about a horizontal axis substantially perpendicular to the brace 28 and a vertical axis. The vertical axis is provided by pivoting the pivot member 33 in a breakaway member 34. This breakaway member, as best shown in FIG. 3, is pivoted to the longitudinal member 14 at a position substantially closer to the pivot member 17 than the normal position of the member 33 when the boom is fully extended. Thus the breakaway member 34 normally forms substantially an extension of the longitudinal member. It is envisioned at this point that the longitudinal members 14 might be replaced by a single heavier longitudinal member at the center of the device and that the breakaway member could be pivoted on lateral members extending therefrom.

The breakaway member 34 is releasably held in its normal position by clip means 35 mounted on the framework and adapted to partially embrace a portion of the member 34 remote from its pivotal mounting. This structure allows the boom to swing away should the outer portions be obstructed as it is pulled. The breakaway member will pull out of the clip means and the boom will swing rearward without breakage until the obstruction is cleared.

The raising of the boom is also affected by the brace 28 and particularly by the fact that the line between the pivot member 17 and member 33 is not perpendicular to the boom. If that line were perpendicular to the boom, the boom would simply rise and still extend outwardly transverse to the framework. Since the line is not perpendicular and the brace 28 is therefore somewhat longer than it would be if that were the case, the raising of the end of the inner leg 16 causes that end to be pushed away somewhat to the rear. Thus the boom can be collapsed into a laterally more compact device than otherwise.

The raising and pivotal motion of the inner leg 16 will also cause some deflection between it and the end 29 of the brace 28. This deflection will cause a sliding of the end 29 over the pivot member 20 and a compression of the spring 30. Such compression causes a bias in a direction which would cause the boom to be lowered and provides a useful starter for motion in that direction.

Having thus described my invention in its embodiment, I am aware that further and extensive variations may be made therefrom without departing from the spirit and scope of my invention as limited only by the following claims.

I claim:

1. For a sprayer having a framework, a folding boom comprising an inner leg pivotally mounted on said framework, an outer leg pivotally connected to said inner leg near the outer end thereof, means for raising said outer end, the outer end of said outer leg being arranged to drop as said end of said inner leg is raised and means connected between said framework and said outer leg to control the dropping thereof including a quadrant on said outer leg and flexible means connected between said quadrant and said framework, said flexible means being adapted to become increasingly engaged with the periphery of said quadrant, said outer leg extending inwardly from the pivot point between it and said inner leg, the extension inward of said outer leg forming one radius of said quadrant.

2. The device of claim 1 in which a brace member extends diagonally between said inner leg and said framework, said framework including a breakaway member pivotally mounted thereon, clip means on said framework adapted to hold said breakaway member releasably in a normal position, said brace being pivotally mounted on said breakaway member whereby movement of said leg in a direction which would normally increase tension in said brace will cause said clip means to release said breakaway member and allow said leg to pivot relative to said framework.

3. The device of claim 2 in which tension spring means is engaged between said breakaway member and said framework to pull said breakaway member back into holding engagement with said clip means upon release of the tension.

4. The device of claim 1 in which a diagonal brace member is pivotally attached to said inner leg and is pivotally attached to said framework, the line between the pivot of said inner leg and frame, and the pivot of said brace and said framework being not perpendicular to the normal position of said outer leg when said outer leg is extended whereby said brace pushes said outer leg and causes it to pivot about a vertical axis as said inner leg is raised.

5. The device of claim 4 in which spring means is engaged between said brace and said inner leg, said spring being biased by the raising of said inner leg so that said leg is urged in the opposite direction.